(12) United States Patent
Tanaka

(10) Patent No.: US 7,375,901 B2
(45) Date of Patent: May 20, 2008

(54) ZOOM LENS

(75) Inventor: Takashi Tanaka, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/723,910

(22) Filed: Mar. 22, 2007

(65) Prior Publication Data

US 2007/0223109 A1     Sep. 27, 2007

(30) Foreign Application Priority Data

Mar. 23, 2006 (JP) .......................... P2006-080193

(51) Int. Cl.
*G02B 15/14* (2006.01)
(52) U.S. Cl. ........................................ 359/687; 359/676
(58) Field of Classification Search ................ 359/676, 359/683, 687
See application file for complete search history.

(56) References Cited

U.S. PATENT DOCUMENTS

| | | | |
|---|---|---|---|
| 6,754,446 B2 * | 6/2004 | Hagimori et al. ............. | 396/72 |
| 7,286,299 B2 * | 10/2007 | Matsui ......................... | 359/687 |
| 7,315,423 B2 * | 1/2008 | Sato ............................. | 359/687 |
| 2004/0095503 A1 | 5/2004 | Iwasawa et al. | |

FOREIGN PATENT DOCUMENTS

| | | |
|---|---|---|
| JP | 8-248318 A | 9/1996 |
| JP | 10-293253 A | 11/1998 |
| JP | 2000-131610 A | 5/2000 |
| JP | 2003-202500 A | 7/2003 |

* cited by examiner

*Primary Examiner*—Scott J. Sugarman
(74) *Attorney, Agent, or Firm*—Birch, Stewart, Kolasch & Birch, LLP

(57) ABSTRACT

A zoom lens is provided and includes a first lens group, a second lens group, an aperture diaphragm, a third lens group, and a fourth lens group in order from the object side. The first lens group and the third lens group are fixed groups, and the second lens group and the fourth lens group are moving groups. The zoom lens has a right-angle prism in the first lens group and satisfies the specific conditions.

16 Claims, 12 Drawing Sheets

FIG. 4A

| | EXAMPLE 1: LENS DATA | | | | |
|---|---|---|---|---|---|
| | Si (SURFACE NUMBER.) | Ri (CURVATURE RADIUS) | Di (SPACING) | Ndj (REFRACTIVE INDEX) | νdj (ABBE NUMBER) |
| GR1 | 1 | 42.949 | 0.77 | 1.92285 | 20.9 |
| | 2 | 11.577 | 2.38 | | |
| | 3 | ∞ | 4.25 | 1.78589 | 44.2 |
| | 4 | ∞ (REFLECTION FACE) | 4.25 | 1.78589 | 44.2 |
| | 5 | ∞ | 0.05 | | |
| | 6 | ∞ | 1.40 | 1.80609 | 40.9 |
| | 7 | −26.914 | 0.10 | | |
| | *8 | 14.679 | 2.17 | 1.58809 | 60.4 |
| | *9 | −31.586 | D9 (VARIABLE) | | |
| GR2 | 10 | −25.102 | 0.62 | 1.83500 | 43.0 |
| | 11 | 11.715 | 0.59 | | |
| | 12 | −21.754 | 0.61 | 1.77250 | 49.6 |
| | 13 | 7.923 | 1.51 | 1.92285 | 18.9 |
| | 14 | 32.552 | D14 (VARIABLE) | | |
| | 15 | (APERTURE DIAPHRAGM) | 0.43 | | |
| GR3 | *16 | 11.428 | 1.27 | 1.51007 | 56.2 |
| | *17 | −66.164 | D17 (VARIABLE) | | |
| GR4 | 18 | 5.781 | 3.26 | 1.67003 | 47.2 |
| | 19 | 34.721 | 0.62 | 1.84660 | 23.9 |
| | 20 | 4.504 | 0.19 | | |
| | *21 | 4.129 | 2.95 | 1.51530 | 62.8 |
| | *22 | 18.686 | D22 (VARIABLE) | | |
| GC | 23 | ∞ | 0.85 | 1.51680 | 64.2 |
| | 24 | ∞ | | | |

(*ASPHERIC SURFACE) (f=6.70~18.97mm, FNO.=3.59~4.33, 2ω=59.6~20.8°)

FIG. 4B

| EXAMPLE 1: VARIABLE SPACING DATA | | |
|---|---|---|
| SPACING | WIDE ANGLE END | TELEPHOTO END |
| D9 | 0.50 | 6.63 |
| D14 | 7.50 | 1.37 |
| D17 | 5.76 | 2.26 |
| D22 | 9.82 | 13.32 |

FIG. 5

| EXAMPLE 1: ASPHERIC DATA | | | |
|---|---|---|---|
| COEF-FICIENT | SURFACE NUMBER | | |
| | 8th SURFACE | 9th SURFACE | 16th SURFACE |
| K | 1.1382416 | 0.2576403 | 2.593395 |
| $A_3$ | 1.3603144E-06 | 4.1689526E-05 | 0 |
| $A_4$ | -4.6555782E-05 | -9.0040741E-05 | 1.3516476E-04 |
| $A_5$ | -6.5710036E-06 | 7.1909080E-07 | 0 |
| $A_6$ | 9.3884089E-07 | 6.6971150E-07 | -6.2418241E-05 |
| $A_7$ | -3.3491090E-07 | -3.5607202E-07 | 0 |
| $A_8$ | -3.6158376E-08 | -5.0636672E-08 | 8.4566111E-06 |
| $A_9$ | -2.8082660E-09 | -2.6278937E-09 | 0 |
| $A_{10}$ | 9.9702984E-10 | 1.9787892E-09 | -3.9447883E-07 |
| $A_{11}$ | -4.7717386E-11 | -1.3357242E-11 | 0 |
| $A_{12}$ | -2.6910752E-12 | 7.9170785E-13 | 0 |
| | 17th SURFACE | 21st SURFACE | 22nd SURFACE |
| K | 1 | 0.7090791 | 1.3761023 |
| $A_3$ | 0 | -3.2472446E-04 | -5.4051532E-04 |
| $A_4$ | 3.7244951E-04 | 1.8072013E-04 | 2.0863998E-03 |
| $A_5$ | 0 | -1.5250381E-04 | 2.3818992E-04 |
| $A_6$ | -6.3903802E-05 | 1.6586236E-05 | -3.8477357E-05 |
| $A_7$ | 0 | 7.7831788E-06 | -2.1305524E-05 |
| $A_8$ | 8.4169553E-06 | -8.5753847E-07 | 3.8302314E-06 |
| $A_9$ | 0 | -5.9352895E-07 | 3.6702872E-06 |
| $A_{10}$ | -3.6008406E-07 | -4.5762266E-08 | 9.0043612E-07 |
| $A_{11}$ | 0 | 4.8412867E-08 | -6.7872010E-08 |
| $A_{12}$ | 0 | -8.3243574E-09 | -1.0753366E-07 |

FIG. 6A

| | EXAMPLE 2: LENS DATA | | | | |
|---|---|---|---|---|---|
| | Si (SURFACE NUMBER.) | Ri (CURVATURE RADIUS) | Di (SPACING) | Ndj (REFRACTIVE INDEX) | vdj (ABBE NUMBER) |
| GR1 | 1 | 39.839 | 0.77 | 1.92285 | 20.9 |
| | 2 | 11.118 | 2.38 | | |
| | 3 | ∞ | 4.15 | 1.74399 | 44.8 |
| | 4 | ∞(REFLECTION FACE) | 4.15 | 1.74399 | 44.8 |
| | 5 | ∞ | 0.05 | | |
| | 6 | ∞ | 1.39 | 1.67003 | 47.2 |
| | 7 | −29.773 | 0.10 | | |
| | 8 | 17.272 | 2.08 | 1.72915 | 54.7 |
| | 9 | −31.203 | D9 (VARIABLE) | | |
| GR2 | 10 | −29.223 | 0.62 | 1.83500 | 43.0 |
| | 11 | 15.519 | 0.55 | | |
| | 12 | −21.479 | 0.61 | 1.80400 | 46.6 |
| | 13 | 6.909 | 1.54 | 1.92285 | 18.9 |
| | 14 | 21.505 | D14 (VARIABLE) | | |
| | 15 | (APERTURE DIAPHRAGM) | 0.43 | | |
| GR3 | *16 | 11.015 | 1.30 | 1.51007 | 56.2 |
| | *17 | −47.677 | D17 (VARIABLE) | | |
| GR4 | 18 | 5.914 | 3.20 | 1.67003 | 47.2 |
| | 19 | 36.684 | 0.62 | 1.84660 | 23.9 |
| | 20 | 4.548 | 0.21 | | |
| | *21 | 4.275 | 2.93 | 1.51530 | 62.8 |
| | *22 | 20.342 | D22 (VARIABLE) | | |
| GC | 23 | ∞ | 0.85 | 1.51680 | 64.2 |
| | 24 | ∞ | | | |

(*ASPHERIC SURFACE)(f=6.70~18.97mm, FNO.=3.59~4.33, 2ω=59.6~20.8°)

FIG. 6B

| EXAMPLE 2: VARIABLE SPACING DATA | | |
|---|---|---|
| SPACING | WIDE ANGLE END | TELEPHOTO END |
| D9 | 0.50 | 6.75 |
| D14 | 7.62 | 1.37 |
| D17 | 6.05 | 2.25 |
| D22 | 9.57 | 13.37 |

FIG. 7

| COEF-FICIENT | EXAMPLE 2: ASPHERIC DATA ||||
|---|---|---|---|---|
| | SURFACE NUMBER ||||
| | 16th SURFACE | 17th SURFACE | 21st SURFACE | 22nd SURFACE |
| K | 0.4794099 | 1 | 0.6356686 | −7.0302579 |
| $A_3$ | 0 | 0 | −5.2311870E−05 | 1.8096994E−04 |
| $A_4$ | 8.3381813E−05 | 1.4328416E−04 | 3.4075166E−04 | 1.6622015E−03 |
| $A_5$ | 0 | 0 | −1.0550770E−04 | 2.1467020E−04 |
| $A_6$ | −1.6619882E−05 | −1.4611790E−05 | −8.6499421E−06 | 3.5434238E−05 |
| $A_7$ | 0 | 0 | 1.0560292E−05 | −1.8112086E−05 |
| $A_8$ | 1.4336673E−06 | 8.5532411E−07 | 2.6655520E−06 | −4.7696553E−06 |
| $A_9$ | 0 | 0 | −7.7637882E−08 | 8.1750134E−07 |
| $A_{10}$ | −6.3787678E−08 | −2.2575695E−08 | −2.5305934E−07 | 1.0092630E−06 |
| $A_{11}$ | 0 | 0 | −6.5894182E−08 | 3.5528480E−07 |
| $A_{12}$ | 0 | 0 | 1.4227854E−08 | 2.2309997E−08 |
| $A_{13}$ | 0 | 0 | 1.4810775E−09 | 5.2114146E−09 |
| $A_{14}$ | 0 | 0 | 5.4389517E−10 | −5.8872821E−09 |
| $A_{15}$ | 0 | 0 | 3.5923101E−11 | −4.1005733E−09 |
| $A_{16}$ | 0 | 0 | −2.4042666E−11 | −1.6340320E−09 |
| $A_{17}$ | 0 | 0 | −5.5128748E−11 | −4.1032648E−10 |
| $A_{18}$ | 0 | 0 | −1.1829826E−11 | −1.2268671E−12 |
| $A_{19}$ | 0 | 0 | −2.1198591E−12 | 9.3817612E−11 |
| $A_{20}$ | 0 | 0 | 3.7212268E−12 | 7.0432026E−12 |

FIG. 8A

| | EXAMPLE 3: LENS DATA | | | | |
|---|---|---|---|---|---|
| | Si (SURFACE NUMBER.) | Ri (CURVATURE RADIUS) | Di (SPACING) | Ndj (REFRACTIVE INDEX) | νdj (ABBE NUMBER) |
| GR1 | 1 | ∞ | 0.77 | 1.92285 | 20.9 |
| | 2 | 14.902 | 2.03 | | |
| | 3 | ∞ | 4.25 | 1.78589 | 44.2 |
| | 4 | ∞ (REFLECTION FACE) | 4.25 | 1.78589 | 44.2 |
| | 5 | ∞ | 0.05 | | |
| | 6 | ∞ | 1.45 | 1.78589 | 44.2 |
| | 7 | −23.296 | 0.10 | | |
| | 8 | 17.379 | 1.92 | 1.72915 | 54.7 |
| | 9 | −52.889 | D9 (VARIABLE) | | |
| GR2 | 10 | −82.333 | 0.62 | 1.83500 | 43.0 |
| | 11 | 11.361 | 0.67 | | |
| | 12 | −15.426 | 0.61 | 1.80400 | 46.6 |
| | 13 | 7.515 | 1.53 | 1.92285 | 18.9 |
| | 14 | 32.198 | D14 (VARIABLE) | | |
| | 15 | (APERTURE DIAPHRAGM) | 0.43 | | |
| GR3 | *16 | 9.117 | 1.27 | 1.51007 | 56.2 |
| | *17 | −151.075 | D17 (VARIABLE) | | |
| GR4 | 18 | 5.950 | 3.00 | 1.67003 | 47.2 |
| | 19 | 50.397 | 0.62 | 1.84660 | 23.9 |
| | 20 | 4.740 | 0.23 | | |
| | *21 | 4.556 | 2.88 | 1.51530 | 62.8 |
| | *22 | 21.935 | D22 (VARIABLE) | | |
| GC | 23 | ∞ | 0.85 | 1.51680 | 64.2 |
| | 24 | ∞ | | | |

(*ASPHERIC SURFACE)(f=6.70~18.97mm, FNO.=3.59~4.33, 2ω=59.6~20.8°)

FIG. 8B

| EXAMPLE 3: VARIABLE SPACING DATA | | |
|---|---|---|
| SPACING | WIDE ANGLE END | TELEPHOTO END |
| D9 | 0.50 | 6.72 |
| D14 | 7.58 | 1.37 |
| D17 | 6.23 | 2.23 |
| D22 | 9.66 | 13.66 |

FIG. 9

| COEF-FICIENT | EXAMPLE 3: ASPHERIC DATA | | | |
|---|---|---|---|---|
| | SURFACE NUMBER | | | |
| | 16th SURFACE | 17th SURFACE | 21st SURFACE | 22nd SURFACE |
| K | 0.0201104 | 1 | 0.5668571 | 1.3544300 |
| $A_3$ | 0 | 0 | 2.4568925E-04 | 3.5071870E-04 |
| $A_4$ | 4.4091162E-06 | 5.9169058E-05 | 1.7926265E-04 | 1.8300067E-03 |
| $A_5$ | 0 | 0 | 8.1046763E-05 | 4.4329221E-05 |
| $A_6$ | -1.8581087E-05 | -1.9512118E-05 | -1.6247201E-06 | 5.6995543E-05 |
| $A_7$ | 0 | 0 | -1.0423358E-07 | 5.2642384E-06 |
| $A_8$ | 7.6338305E-08 | -1.1046439E-07 | -1.1013188E-09 | 3.7777609E-07 |
| $A_9$ | 0 | 0 | -2.3896855E-10 | 1.7391734E-08 |
| $A_{10}$ | 5.3670731E-10 | -1.2406874E-10 | -5.0793815E-11 | 6.8385467E-10 |
| $A_{11}$ | 0 | 0 | -1.8306054E-11 | 8.0257619E-11 |
| $A_{12}$ | 0 | 0 | -2.4878470E-12 | 4.1185917E-12 |

FIG. 10

| VALUE CONCERNING CONDITIONS | | | |
|---|---|---|---|
| CONDITION | EXAMPLE 1 | EXAMPLE 2 | EXAMPLE 3 |
| CONDITION (1) $N_p$ | 1.786 | 1.744 | 1.786 |
| CONDITION (2) $\nu_p$ | 44.2 | 44.8 | 44.2 |
| CONDITION (3) $D_{2-6}/f_W$ | 1.63 | 1.60 | 1.58 |
| CONDITION (4) $\tau_{10P}$ | 0.96 | 0.95 | 0.96 |
| CONDITION (5) $f_{12}/f_{13}$ | 1.93 | 2.86 | 1.63 |
| CONDITION (6) $\nu_{23A} - \nu_1$ | 29.8 | 30.1 | 28.6 |

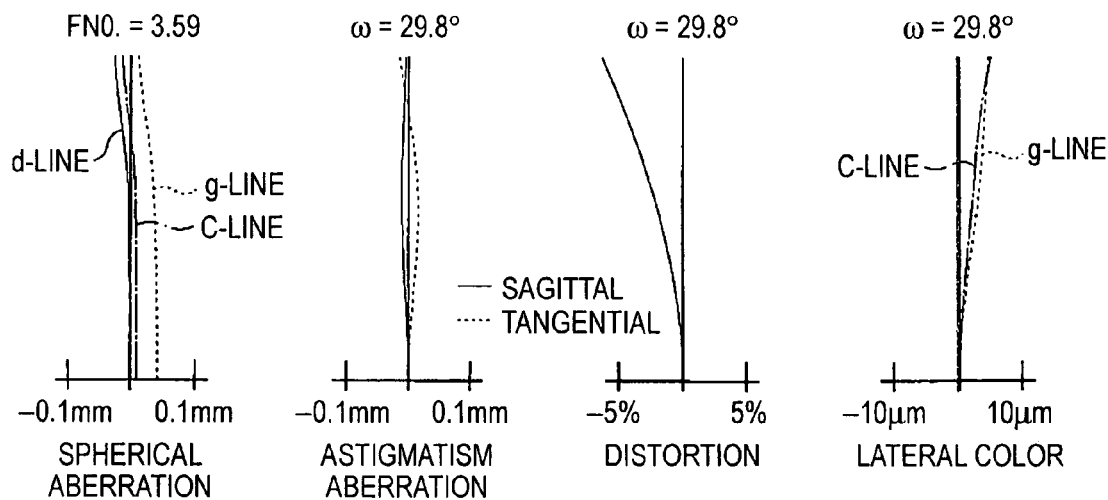
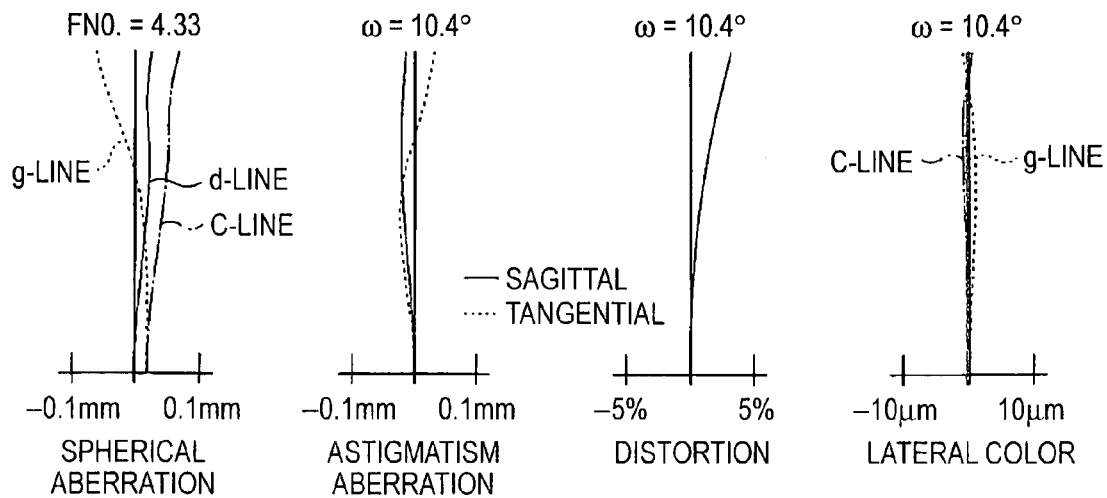

EXAMPLE 2 (WIDE ANGLE END)
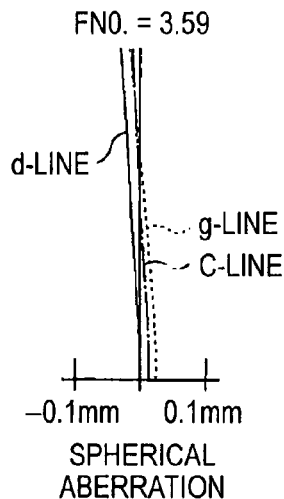
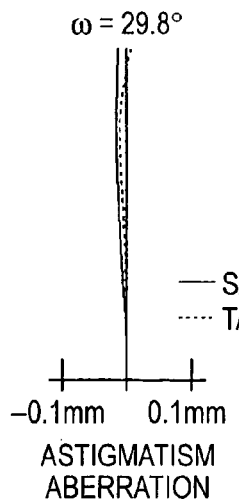
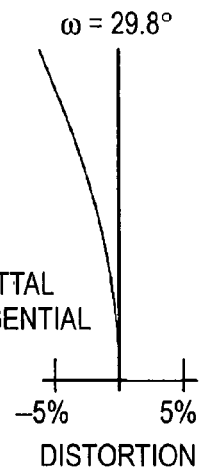
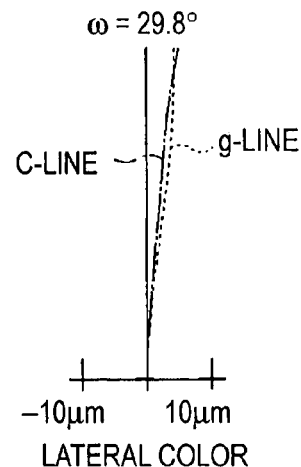
FIG. 13A     FIG. 13B     FIG. 13C     FIG. 13D
EXAMPLE 2 (TELEPHOTO END)
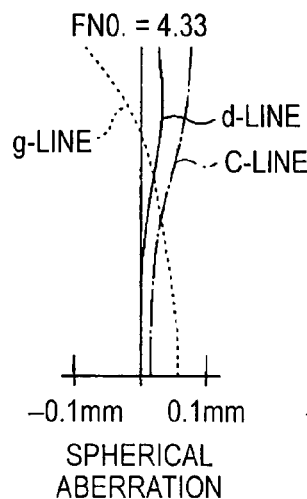
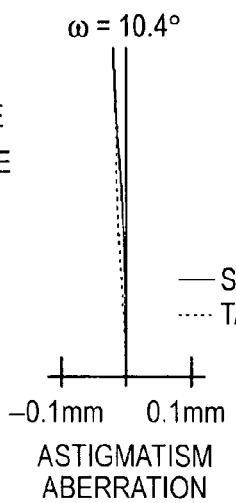
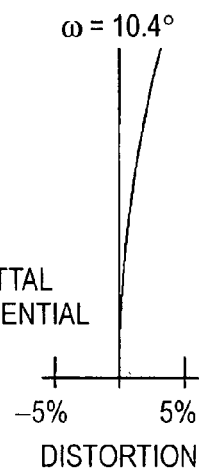
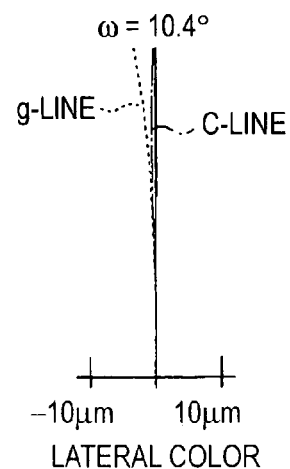
FIG. 14A     FIG. 14B     FIG. 14C     FIG. 14D EXAMPLE 3 (WIDE ANGLE END)
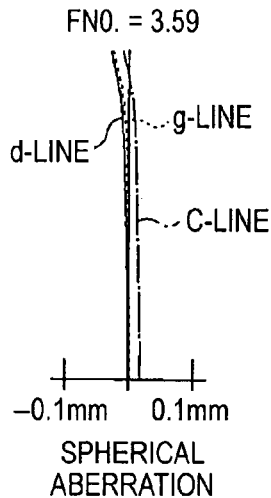
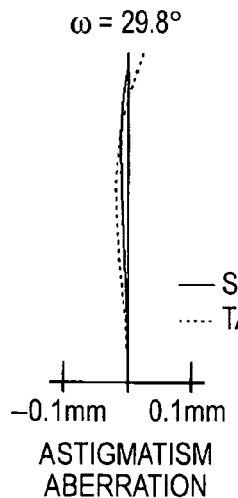
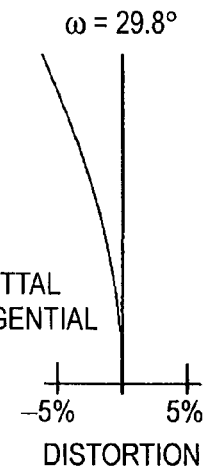
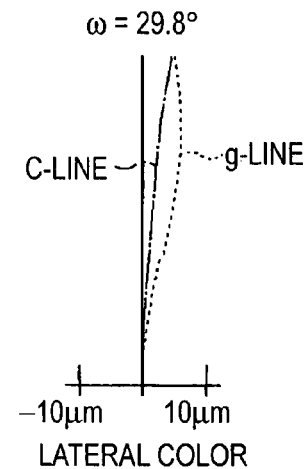
FIG. 15A  FIG. 15B  FIG. 15C  FIG. 15D
EXAMPLE 3 (TELEPHOTO END)
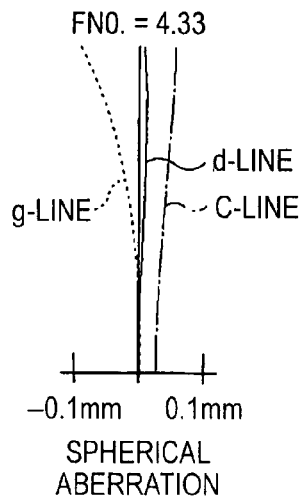
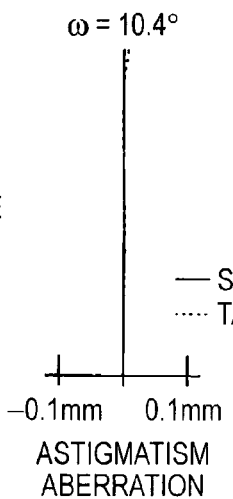
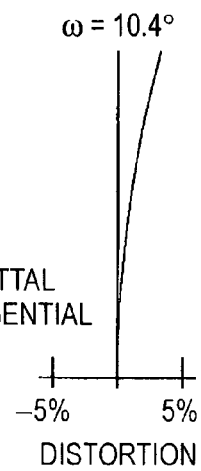
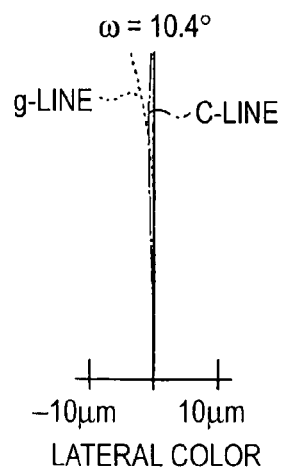
FIG. 16A  FIG. 16B  FIG. 16C  FIG. 16D

ZOOM LENS

BACKGROUND OF THE INVENTION

1. Field of the Invention

This invention relates to a zoom lens capable being used with a small-sized machine having an imaging function, particularly a digital still camera, a mobile telephone with a camera, a personal digital assistance (PDA), etc.

2. Description of Related Art

In recent years, further miniaturization of an imaging apparatus such as a digital still camera as the whole apparatus has been demanded with advance of miniaturization of an imaging device of a CCD (Charge Coupled Device), a CMOS (Complementary Metal Oxide Semiconductor), etc. Accordingly, slimming down of an imaging lens, particularly a zoom lens by shortening the entire length, etc. Hitherto, for a zoom lens having a variable power ratio of about ×3 of zoom lenses used with a digital still camera, etc., a zoom lens made up of three groups has been advantageous for shortening the entire length and has been widely used (Refer to JP-A-10-293253). Each lens group of the zoom lens is movable and although a length to some extent is required when used, the spacing between the groups is narrowed as much as possible when non-used, whereby slimming down is realized. In recent years, however, strong durability against shock of drop, etc., has been demanded for a digital still camera, etc., and the zoom lens made up of three groups described above has a structure wherein a lens barrel for supporting the moving lens groups when used pops up from the imaging apparatus main body and thus there is a limit for increasing the durability.

Then, as a configuration of a zoom lens to provide compatibility between slimming down and strong durability, in a four-group configuration of first positive, second negative, third positive and fourth positive groups, a right-angle prism is placed in the first lens group for bending the optical path approximately 90° at midpoint to form a refractive optical system, thereby shortening the length of the optical system in the thickness direction thereof (Refer to JP-A-8-248318, JP-A-2000-131610 and JP-A-2003-202500). In the configuration, the first lens group is fixed when zoomed and focused and thus a structure wherein the entire lens barrel can be housed in the imaging apparatus main body can be produced, making it possible to increase the durability as compared with the zoom lens made up of three groups described above.

However, the zoom lens described in JP-A-8-248318 is inappropriate for slimming down because the first lens group is large and the overall number of lenses is also large although the zoom lens has a large zoom ratio and a bright F value. The zoom lens described in JP-A-2000-131610 has a small number of lenses and a large angle of field at a wide angle end, but the first lens group is large and the right-angle prism has a low refractive index and is hard to totally reflect and thus reflecting coat becomes necessary on the reflection face of the right-angle prism, resulting in lowering of transmittance in the whole system and an increase in the cost. The zoom lens described in JP-A-2003-202500 involves various examples, which contain some examples of compact zoom lenses with a small number of lenses, but high-refractive index and high-dispersion material is used for the right-angle prism in every example and the transmittance on the short wavelength side of a visible light beam lowers. That is, in JP-A-2003-202500, a right-angle prism of a material with the refractive index at the d-line exceeding 1.8 and the Abbe number less than 30 is adopted as an example; under present circumstances, however, such a high-refractive index and high-dispersion material having sufficiently high transmittance does not exist and is not practical.

SUMMARY OF THE INVENTION

An object of an illustrative, non-limiting embodiment of the present invention is to a zoom lens provided with strong durability when the zoom lens is built in an imaging apparatus although it is slim while maintaining good optical performance with no loss of transmittance in a right-angle prism and with the cost reduced.

According to an aspect of the invention, there is provided a zoom lens comprising: in order from an object side of the zoom lens, a first lens group having a positive refractive power; a second lens group having a negative refractive power; an aperture diaphragm; a third lens group having a positive refractive power; and a fourth lens group having a positive refractive power, wherein the first lens group and the third lens group are fixed when the zoom lens varies a power thereof and is focused, the second lens group moves along an optical axis thereof when the zoom lens varies the power thereof, and the fourth lens group moves along an optical axis thereof when the zoom lens varies a power thereof and is focused. The first lens group comprises: in order from the object side, a first lens having a negative refractive power; a right-angle prism having an internal reflection face for bending an optical path approximately 90°; a second lens having a positive refractive power; and a third lens having positive refractive power, and the first lens group satisfies Conditions:

$$1.71 < N_p < 1.80 \quad (1)$$

$$\nu_p > 30 \quad (2)$$

$$1.4 < D_{2\text{-}6}/f_w < 1.9 \quad (3)$$

wherein $N_p$ is a refractive index of the right-angle prism at the d-line, $\nu_p$ is an Abbe number of the right-angle prism at the d-line, $D_{2\text{-}6}$ is a distance along the optical axis from an image-side surface of the first lens to an object-side surface of the second lens, and $f_w$ is a focal length of the whole system at wide angle end.

In the zoom lens, the right-angle prism may satisfy Condition:

$$\tau_{10P} > 0.87 \quad (4)$$

wherein $\tau_{10P}$ is an internal transmittance at a wavelength of 400 nm in a thickness of the right-angle prism of 10 mm.

In the zoom lens, the second lens and the third lens may satisfy Condition:

$$1.4 < f_{12}/f_{13} < 3.2 \quad (5)$$

wherein $f_{12}$ is a focal length of the second lens, and $f_{13}$ is a focal length of the third lens.

In the zoom lens, each lens in the first lens group may satisfy Condition:

$$25 < \nu_{23A} - \nu_1 < 36 \quad (6)$$

wherein $\nu_{23A}$ is an average value of Abbe numbers of the second lens and the third lens at the d-line, and $\nu_1$ is an Abbe number of the first lens at the d-line.

In the zoom lens, the third lens group may consist of a plastic lens having at least one aspheric surface.

BRIEF DESCRIPTION OF THE DRAWINGS

The features of the invention will appear more fully upon consideration of the exemplary embodiment of the invention, which are schematically set forth in the drawings, in which:

FIG. 4 is a drawing to show lens data of a zoom lens according to example 1; (A) shows lens data and (B) shows data of spacing of portion moving with variable power;

FIG. 5 is a drawing to show data concerning aspheric surfaces of a zoom lens according to example 1;

FIG. 6 is a drawing to show lens data of a zoom lens according to example 2; (A) shows lens data and (B) shows data of spacing of portion moving with variable power;

FIG. 7 is a drawing to show data concerning aspheric surfaces of a zoom lens according to example 2;

FIG. 8 is a drawing to show lens data of a zoom lens according to example 3; (A) shows lens data and (B) shows data of spacing of portion moving with variable power;

FIG. 9 is a drawing to show data concerning aspheric surfaces of a zoom lens according to example 3;

FIG. 10 is a drawing to show the values concerning conditions collectively about the examples;

FIG. 11 is an aberration drawing to show aberrations and distortion of a zoom lens according to example 1 at wide angle end; (A) shows spherical aberration, (B) shows astigmatic aberration, (C) shows distortion, and (D) shows lateral color;

FIG. 12 is an aberration drawing to show aberrations and distortion of the zoom lens according to example 1 at telephoto end; (A) shows spherical aberration, (B) shows astigmatic aberration, (C) shows distortion, and (D) shows lateral color;

FIG. 13 is an aberration drawing to show aberrations and distortion of the zoom lens according to example 2 at wide angle end; (A) shows spherical aberration, (B) shows astigmatic aberration, (C) shows distortion, and (D) shows lateral color;

FIG. 14 is an aberration drawing to show aberrations and distortion of the zoom lens according to example 2 at telephoto end; (A) shows spherical aberration, (B) shows astigmatic aberration, (C) shows distortion, and (D) shows lateral color;

FIG. 15 is an aberration drawing to show aberrations and distortion of the zoom lens according to example 3 at wide angle end; (A) shows spherical aberration, (B) shows astigmatic aberration, (C) shows distortion, and (D) shows lateral color; and FIG. 16 is an aberration drawing to show aberrations and distortion of the zoom lens according to example 3 at telephoto end; (A) shows spherical aberration, (B) shows astigmatic aberration, (C) shows distortion, and (D) shows lateral color.

DETAILED DESCRIPTION OF THE EXEMPLARY EMBODIMENTS

Although the invention will be described below with reference to the exemplary embodiments thereof, the following exemplary embodiments and modifications do not restrict the invention.

According to an exemplary embodiment of a zoom lens of the invention, the right-angle prism is placed in the first lens group to form the refractive optical system, and the length of the optical system in the thickness direction thereof is suppressed, so that while good optical performance is maintained, slimming down is facilitated. Since the first lens group is fixed at all times, a structure wherein the entire lens barrel is housed in the imaging apparatus main body can be produced, and it is made possible to increase the durability when the zoom lens is built in the imaging apparatus. Further, the zoom lens satisfies the appropriate condition concerning the right-angle prism and the material is optimized, so that lowering of the transmittance in the right-angle prism can be suppressed and the cost can also be easily reduced. Thus, the zoom lens can be provided with strong durability when it is built in an imaging apparatus although it is slim while maintaining good optical performance and in addition, impairing transmittance in the right-angle prism can be suppressed and the cost can also be reduced.

Exemplary embodiments of the invention will be discussed in detail with reference to the accompanying drawings.

Figure 1:
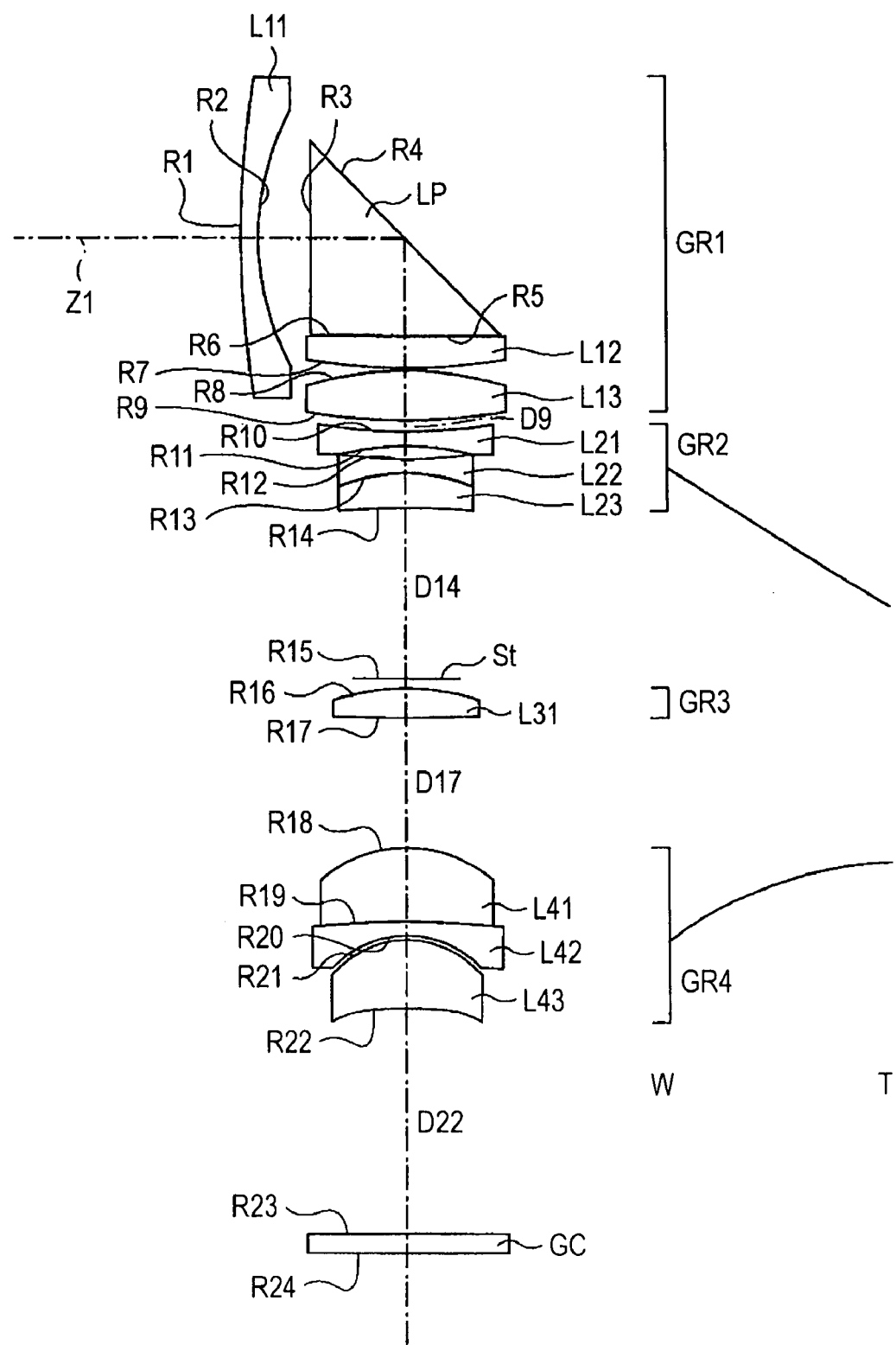
FIG. 1 shows a first configuration example of a zoom lens according to an exemplary embodiment of the invention and is a lens sectional view corresponding to example 1.
Figure 2:
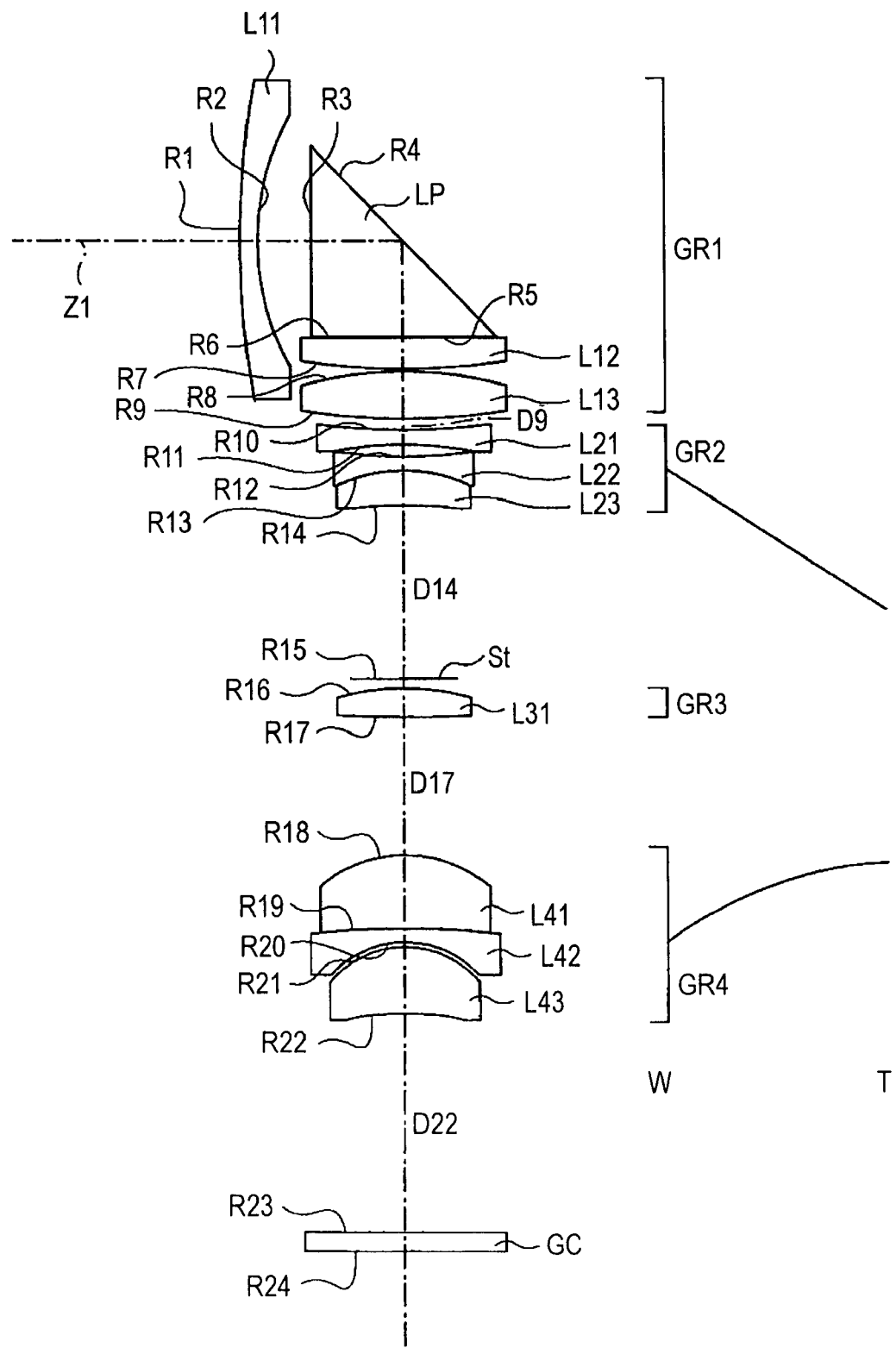
FIG. 2 shows a second configuration example of a zoom lens according to an exemplary embodiment of the invention and is a lens sectional view corresponding to example 2.
Figure 3:
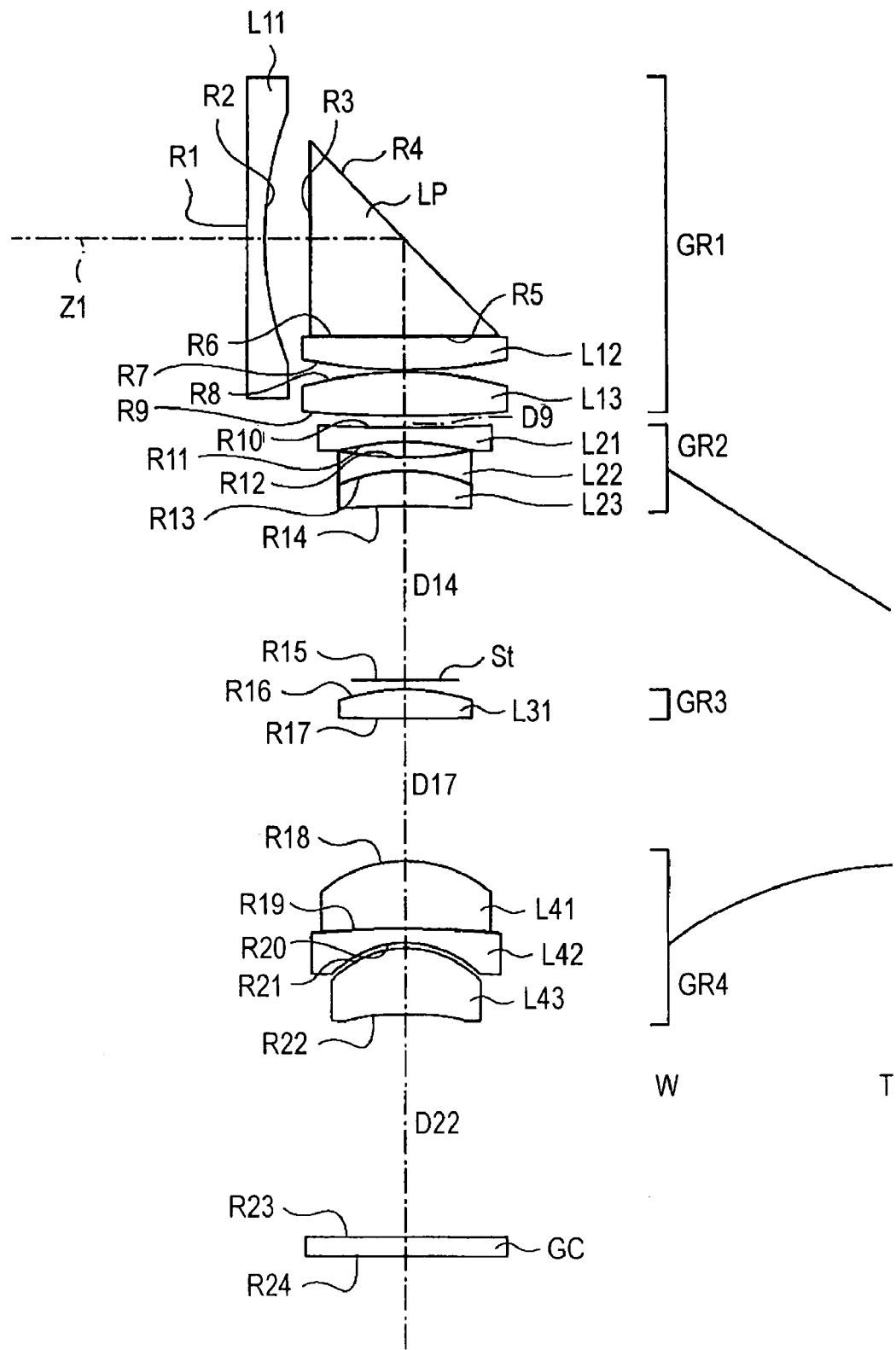
FIG. 3 shows a third configuration example of a zoom lens according to an exemplary embodiment of the invention and is a lens sectional view corresponding to example 3.

FIG. 1 shows a first configuration example of a zoom lens as one exemplary embodiment of the invention. This configuration example corresponds to the lens configuration in a first numeric example described later with reference to FIGS. 4 (A) and 4 (B) and FIG. 5. FIG. 2 shows a second configuration example. It corresponds to the lens configuration in a second numeric example described later with reference to FIGS. 6 (A) and 6 (B) and FIG. 7. FIG. 3 shows a third configuration example. It corresponds to the lens configuration in a third numeric example described later with reference to FIGS. 8 (A) and 8 (B) and FIG. 9. In FIGS. 1 to 3, symbol Ri denotes the curvature radius of the ith surface when the surface of the component nearest to an object is the first and symbols are given so as to increase in order toward the image side (image formation side). Symbol Di denotes the surface distance on an optical axis Z1 between the ith surface and the (i+1)st surface. For the symbol Di, the symbol is given only to spacings D9, D14, D17, and D22 of portions changing with variable power. The configuration examples are the same in basic configuration and therefore the description to follow is based on the configuration example of the imaging lens set shown in FIG. 1.

The zoom lens is installed in a small-sized machine having an imaging function, such as a digital still camera, a mobile telephone with a camera, or a PDA for use. The zoom lens includes a first lens group GR1 having a positive refractive power, a second lens group GR2 having a negative refractive power, an aperture diaphragm St for adjusting the light quantity, a third lens group GR3 having a positive refractive power, and a fourth lens group GR4 having a positive refractive power placed in order from the object side along the optical axis Z1.

For example, an imaging device (not shown) is placed on an image formation surface (imaging surface) of the zoom lens. Various optical members GC are placed between the fourth lens group GR4 and the imaging surface in response to the configuration of the camera in which the lenses are placed. As the optical members GC, for example, flat members of cover glass for protecting the imaging surface, various optical filters, etc., are placed.

In the zoom lens, the first lens group GR1 and the third lens group GR3 are fixed at all times (i.e., when the zoom lens varies a power thereof and is focused) and the second lens group GR2 moves along the optical axis Z1 at the variable power time (i.e., when the zoom lens varies a power thereof) and the fourth lens group GR4 moves along the optical axis Z1 at the variable power time (i.e., when the zoom lens varies a power thereof) and at the focusing time (i.e., when the zoom lens is focused). The second lens group GR2 mainly bears variable power action and the fourth lens group GR4 bears correction action of image surface variation accompanying variable power. The second lens group GR2 and the fourth lens group GR4 move so as to draw paths indicated by solid lines in the figure in accordance with variable power from a wide angle end to a telephoto end. In FIGS. 1 to 3, W denotes the lens position at the wide angle end and T denotes the lens position at the telephoto end.

The first lens group GR1 includes a first lens L11 having a negative refractive power, a right-angle prism LP having an internal reflection face for bending the optical path approximately 90°, a second lens L12 having a positive refractive power, and a third lens L13 having a positive refractive power in order from the object side. The first lens L11 has a negative meniscus shape with a concave face directed to the image side or a planoconcave shape, for example. The second lens L12 has a planoconvex shape, for example, and the third lens L13 has a biconvex shape, for example. Preferably, the first lens L11 is sufficiently miniaturized for slimming down when the zoom lens is installed in an imaging apparatus. Thus, preferably, for example, the refractive index of the first lens L11 preceding the right-angle prism LP is set high; for example, the refractive index at the d-line is set larger than 1.8 or 1.9. Accordingly, the lens diameter and the lens thickness of the first lens L11 can be lessened and a comparatively smart shape as a whole can also be made so as not to have a large curvature. The right-angle prism LP can be miniaturized. For the right-angle prism LP, preferably the material is optimized according to conditions described later.

The second lens group GR2 includes a biconcave negative lens L21 and a cemented lens having a negative refractive power in order from the object side, for example. The cemented lens includes a biconcave negative lens L22 and a positive lens L23 with a convex face directed to the object side in order from the object side, for example.

The third lens group GR3 is implemented as one lens L31, for example. Preferably, the lens L31 is formed of a plastic lens with at least one surface made an aspheric surface. Accordingly, it is made possible to reduce the cost while maintaining good optical performance.

The fourth lens group GR4 includes a cemented lens made up of two lenses L41 and L42 and a positive lens L43 with a convex face directed to the object side in order from the object side, for example.

The zoom lens satisfies the following Conditions (1), (2) and (3), wherein $N_p$ denotes the refractive index of the right-angle prism LP at the d-line, $v_p$ denotes the Abbe number of the right-angle prism LP at the d-line, $D_{2-6}$ denotes the distance on the optical axis Z1 from the image side surface of the first lens L11 in the first lens group GR1 to the object side surface of the second lens L12, and $f_w$ denotes the focal length of the whole system at the wide angle end:

$$1.71 < N_p < 1.80 \tag{1}$$

$$v_p > 30 \tag{2}$$

$$1.4 < D_{2-6}/f_w < 1.9 \tag{3}$$

Preferably, the right-angle prism LP further satisfies the following Condition, wherein $\tau_{10P}$ denotes internal transmittance at wavelength 400 nm in thickness 10 mm of the right-angle prism LP:

$$\tau_{10P} > 0.87 \tag{4}$$

Preferably, the second lens L12 and the third lens L13 in the first lens group GR1 satisfy the following Condition, wherein $f_{12}$ denotes the focal length of the second lens L12 and $f_{13}$ denotes the focal length of the third lens L13:

$$1.4 < f_{12}/f_{13} < 3.2 \tag{5}$$

Preferably, the lenses in the first lens group GR1 satisfy the following Condition wherein $v_{23A}$ denotes the average value of the Abbe numbers of the second lens L12 and the third lens L13 in the first lens group GR1 at the d-line and $v_1$ denotes the Abbe number of the first lens L11 in the first lens group GR1 at the d-line:

$$25 < v_{23A} - v_1 < 36 \tag{6}$$

Next, the functions and the advantages of the zoom lens described above will be discussed.

In the zoom lens, object light incident on the first lens group GR1 is bent by the internal reflection face of the right-angle prism LP approximately 90° to the side of the second lens group GR2 and is formed on the imaging device (not shown) placed so as to be orthogonal to the incidence plane of the first lens group GR1. Zooming is performed by moving the second lens group GR2 and the fourth lens group GR4 along the optical path Z1 for changing the spacing therebetween.

The configuration of the refractive optical system is adopted, so that while good optical performance is maintained, the length of the optical system in the thickness direction thereof can be suppressed and it is made possible to accomplish slimming down when the zoom lens is built in an imaging apparatus. Since the first lens group GR1 is fixed at all times, a structure wherein the whole of a lens barrel is housed in the imaging apparatus main body can be produced, and it is made possible to increase the durability when the zoom lens is built in the imaging apparatus.

A reflecting mirror, a reflecting prism, or the like is also possible as a component having the reflecting function to bend the optical path approximately 90°. However, the right-angle prism (internal reflecting prism) LP having an internal reflection face rather than a reflecting mirror, a reflecting prism, etc., would make it possible to implement an optically equivalent configuration more compactly, because the right-angle prism LP allows a light beam to pass through a medium having a higher refractive index than air, so that the optical path length (the product of refractive index and geometric length) in terms of air can be provided long while the geometric length is shortened.

Further, the zoom lens satisfies the appropriate condition concerning the right-angle prism LP, so that the material can be optimized and lowering of the transmittance in the right-angle prism LP can be suppressed while the cost can be easily reduced. Condition (1) defines the appropriate refractive index $N_p$ of the right-angle prism LP. If the lower limit of Condition (1) is exceeded, it is not preferable because contribution to compaction lessens. The inclination angle of the main light beam from the optical axis Z1 in the right-angle prism LP at the wide angle end increases and approaches the clinical angle of total reflection condition and the light quantity loss grows. On the other hand, if the upper limit of condition (1) is exceeded, it is not preferable because high-cost material increases. Condition (2) defines the appropriate Abbe number $\nu_p$ of the right-angle prism LP. If the lower limit of Condition (2) is exceeded, it is not preferable because the transmittance on the short wavelength side of a visible light beam easily lowers. Condition (4) shows the effect of Condition (2) more specifically and defines the appropriate internal transmittance of the right-angle prism LP. If the lower limit of Condition (4) is exceeded, it is not preferable because the transmittance on the short wavelength side of a visible light beam lowers.

Condition (3) defines an appropriate space to insert the right-angle prism LP between the first lens L11 and the second lens L12 in the first lens group GR1. If the lower limit of Condition (3) is exceeded, the space between the first lens L11 and the second lens L12 becomes too small and it becomes impossible to insert the right-angle prism LP or the first lens L11 interferes with the second lens L12 or the third lens L13 positionally and it becomes impossible to place the lens physically. On the other hand, if the upper limit of Condition (3) is exceeded, it is not preferable because the space between the first lens L11 and the second lens L12 becomes too large and compactness is lost.

Condition (5) defines the appropriate relationship of the refractive power ratio between the second lens L12 and the third lens L13 in the first lens group GR1. In the zoom lens, in the first lens group GR1, the two positive lenses of the second lens L12 and the third lens L13 are placed behind the right-angle prism LP for dispersing the positive refractive power properly, thereby suppressing worsening of distortion, etc. If the lower limit of Condition (5) is exceeded, the refractive power of the second lens L12 in the first lens group GR1 grows and accordingly the refractive power of the first lens L11 in the first lens group GR1 also grows, making it hard to correct distortion at the wide angle end. On the other hand, if the upper limit of Condition (5) is exceeded, it is not preferable because the refractive power of the second lens L12 in the first lens group GR1 becomes too small and the advantage of dispersing the positive refractive power to the second lens L12 and the third lens L13 for maintaining the optical performance is eliminated.

Condition (6) is a condition for correcting the chromatic aberration (lateral color) occurring in the first lens group GR1 in good balance. If the lower limit of Condition (6) is exceeded, correction of the chromatic aberration occurring in the first lens group GR1 becomes insufficient and lateral color at the wide angle end and axial chromatic aberration at the telephoto end worsen. On the other hand, if the upper limit of Condition (6) is exceeded, it is not preferable because correction of the chromatic aberration occurring in the first lens group GR1 becomes excessive and lateral color at the wide angle end and axial chromatic aberration at the telephoto end worsen.

As described above, according to the zoom lens according to the embodiment, the right-angle prism LP for bending the optical path approximately 90° is placed in the first lens group GR1 to form the refractive optical system and the configurations of the lens groups are set appropriately, so that while maintaining good optical performance, the zoom lens is provided with strong durability when the zoom lens is built in an imaging apparatus although it is slim, and in addition, impairing transmittance in the right-angle prism can be suppressed and the cost can also be reduced.

EXAMPLES

Next, specific numeric examples of the zoom lens according to the embodiment will be discussed. First to third numeric examples will be discussed together.

FIGS. 4 (A) and 4 (B) and FIG. 5 show specific lens data corresponding to the configuration of the zoom lens shown in FIG. 1. Particularly, FIG. 4 (A) shows lens data and FIG. 4 (B) and FIG. 5 show any other data. The column of surface number Si in the lens data shown in FIG. 4 (A) indicates the number of the ith (i=1 to 24) surface with the symbol given so as to increase in order toward the image side wherein the surface of the component nearest to the object side is the first for the zoom lens according to example 1. The column of curvature radius Ri indicates the value (mm) of the curvature radius of the ith surface from the object side corresponding to the symbol Ri given in FIG. 1. Likewise, the column of spacing Di also indicates the spacing (mm) on the optical axis between the ith surface Si and the "i+1"st surface Si+1 from the object side. The column of Ndj indicates the value of the refractive index of the jth (j=1 to 13) optical element from the object side at the d-line (wavelength 587.6 nm). The column of vdj indicates the value of the Abbe number of the jth optical element from the object side at the d-line (wavelength 587.6 nm). FIG. 4 (A) also shows the values of paraxial focal length f (mm), F number (FNO.), and angle of view 2ω (ω: Half angle of view) of the entire system at the wide angle end and the telephoto end as general data.

In the zoom lens according to example 1, the second lens group GR2 and the fourth lens group GR4 move on the optical axis with variable power and thus the values of the spacings D9, D14, D17, and D22 before and after each lens group are variable. FIG. 4 (B) shows the values at the wide angle end and the telephoto end as the data of the spacings D9, D14, D17, and D22 at the variable power time.

In the lens data in FIG. 4 (A), symbol "*" given to the left of the surface number indicates that the lens face is an aspheric shape. In the zoom lens according to example 1, both surfaces S8 and S9 of the third lens L13 in the first lens group GR1, both surfaces S16 and S17 of the lens L31 in the third lens group GR3, and both surfaces S21 and S22 of the lens L43 in the fourth lens group GR4 are all aspheric. In the basic lens data in FIG. 4 (A), the numeric value of the curvature radius in the proximity of the optical axis is shown as the curvature radius of each of the aspheric surfaces.

FIG. 4 (B) shows aspheric data in the zoom lens according to example 1. In the numeric values shown as the aspheric data, symbol "E" indicates that the numeric value following the symbol "E" is "exponent" with 10 as the base and indicates that the numeric value represented by the exponential function with 10 as the base is multiplied by the numeric value preceding "E." For example, if "1.0E-02" is shown, it indicates "1.0×10⁻²."

As the aspheric data of the zoom lens according to example 1, the values of coefficients $A_n$ and K in the expressions of aspheric shapes represented by the following expression (A) are shown. Z more particularly indicates the length (mm) of the normal to the tangential plane of the top of an aspheric surface (plane perpendicular to the optical axis) from a point on the aspheric surface at the position of height h from the optical axis.

$$Z = C \cdot h^2 / \{1 + (1 - K \cdot C^2 \cdot h^2)^{1/2}\} + \Sigma A_n \cdot h^n \quad \text{(A)}$$

(n=integer of 3 or greater)

where

Z: Depth of aspheric surface (mm)

h: Distance from optical axis to lens surface (height) (mm)

K: Eccentricity

C: Paraxial curvature=1/R (R: Paraxial curvature radius)

$A_n$: nth-order aspheric coefficient

In the zoom lens according to example 1, both surfaces S8 and S9 of the third lens L13 in the first lens group GR1 and both surfaces S21 and S22 of the lens L43 in the fourth lens group GR4 are represented effectively using orders of $A_3$ to $A_{12}$ as aspheric coefficient $A_n$. Both surfaces S16 and S17 of the lens L31 in the third lens group GR3 are represented effectively using only even-numbered-order coefficients $A_4$, $A_6$, $A_8$, and $A_{10}$ as aspheric coefficient $A_n$.

FIGS. 6 (A), 6 (B), and 7 show the specific lens data corresponding to the configuration of the zoom lens shown in FIG. 2 as example 2 like the zoom lens according to example 1 described above. Likewise, FIGS. 8 (A), 8 (B), and 9 show the specific lens data corresponding to the configuration of the zoom lens shown in FIG. 3 as example 3.

In example 1, both surfaces of the third lens L13 in the first lens group GR1 are aspheric; both surfaces of a third lens L13 are spherical in zoom lenses according to examples 2 and 3. In examples 2 and 3, both surfaces of a lens L31 in a third lens group GR3 and a lens L43 in a fourth lens group GR4 are aspheric as in example 1. In the zoom lens according to example 2, both surfaces S16 and S17 of the lens L31 in the third lens group GR3 are represented effectively using only even-numbered-order coefficients $A_4$, $A_6$, $A_8$, and $A_{10}$ as aspheric coefficient $A_n$ and both surfaces S21 and S22 of the lens L43 in the fourth lens group GR4 are represented effectively using orders of $A_3$ to $A_{20}$. In the zoom lens according to example 3, both surfaces S16 and S17 of the lens L31 in the third lens group GR3 are represented effectively using only even-numbered-order coefficients $A_4$, $A_6$, $A_8$, and $A_{10}$ as aspheric coefficient $A_n$ and both surfaces S21 and S22 of the lens L43 in the fourth lens group GR4 are represented effectively using orders of $A_3$ to $A_{12}$.

FIG. 10 shows the values concerning the conditions described above collectively for the examples. As seen in FIG. 10, the values in the examples are all within the numeric ranges in the conditions.

FIGS. 11 (A) to 11 (D) show spherical aberration, astigmatic aberration, distortion, and lateral color at the wide angle end in the zoom lens according to example 1. FIGS. 12 (A) to 12 (D) show spherical aberration, astigmatic aberration, distortion, and lateral color at the telephoto end in the zoom lens according to example 1. Each aberration drawing shows the aberration with the d line as the reference wavelength. Spherical aberration drawing and lateral color drawing also show the aberration relative to g line (wavelength 435.8 nm) and C line (wavelength 656.3 nm). In the astigmatic aberration drawing, the solid line indicates aberration in a sagittal direction and the dashed line indicates aberration in a tangential direction. FNO. indicates F value and ω indicates half angle of view.

Likewise, aberrations and distortion about the zoom lens according to example 2 are shown in FIGS. 13 (A) to 13 (D) (wide angle end) and are shown in FIGS. 14 (A) to 14 (D) (telephoto end). Likewise, aberrations and distortion about the zoom lens according to example 3 are shown in FIGS. 15 (A) to 15 (D) (wide angle end) and are shown in FIGS. 16 (A) to 16 (D) (telephoto end).

As seen from the numeric data and the aberration drawings, the aberrations and distortion are well corrected for each example and the zoom lens suited to the purpose of being installed in an imaging apparatus and being slimmed down can be implemented.

It is to be understood that the invention is not limited to the specific embodiment or examples thereof and various modifications may be made. For example, the values of the curvature radius, the spacing, the refractive index, and the like of each lens component are not limited to the values shown in the numeric examples and can take any other value.

This application claims foreign priority from Japanese Patent Application No. 2006-80193, filed Mar. 23, 2006, the entire disclosure of which is herein incorporated by reference.

What is claimed is:

1. A zoom lens comprising: in order from an object side of the zoom lens,
    a first lens group having a positive refractive power;
    a second lens group having a negative refractive power;
    an aperture diaphragm;
    a third lens group having a positive refractive power; and
    a fourth lens group having a positive refractive power,
    wherein
    the first lens group and the third lens group are fixed when the zoom lens varies a power thereof and is focused, the second lens group moves along an optical axis thereof when the zoom lens varies the power thereof, and the fourth lens group moves along an optical axis thereof when the zoom lens varies a power thereof and is focused,
    the first lens group comprises: in order from the object side, a first lens having a negative refractive power; a right-angle prism having an internal reflection face for bending an optical path approximately 90°; a second lens having a positive refractive power; and a third lens having positive refractive power, and
    the first lens group satisfies Conditions:

$$1.71 < N_p < 1.80 \tag{1}$$

$$\nu_p > 30 \tag{2}$$

$$1.4 < D_{2-6}/f_w < 1.9 \tag{3}$$

wherein
    $N_p$ is a refractive index of the right-angle prism at the d-line,
    $\nu_p$ is an Abbe number of the right-angle prism at the d-line,
    $D_{2-6}$ is a distance along the optical axis from an image-side surface of the first lens to an object side surface of the second lens, and
    $f_w$ is a focal length of the zoom lens at wide angle end.

2. The zoom lens as claimed in claim 1, wherein the right-angle prism satisfies Condition:

$$\tau_{10P} > 0.87 \tag{4}$$

wherein $\tau_{10P}$ is an internal transmittance at a wavelength of 400 nm in a thickness of the right-angle prism of 10 mm.

3. The zoom lens as claimed in claim 1, wherein the second lens and the third lens satisfy Condition:

$$1.4 < f_{12}/f_{13} < 3.2 \tag{5}$$

wherein $f_{12}$ is a focal length of the second lens, and $f_{13}$ is a focal length of the third lens.

4. The zoom lens as claimed in claim 2, wherein the second lens and the third lens satisfy Condition:

$$1.4 < f_{12}/f_{13} < 3.2 \tag{5}$$

wherein $f_{12}$ is a focal length of the second lens, and $f_{13}$ is a focal length of the third lens.

5. The zoom lens as claimed in claim 1, wherein each lens in the first lens group satisfies Condition:

$$25 < \nu_{23,4} - \nu_1 < 36 \tag{6}$$

wherein $v_{23A}$ is an average value of Abbe numbers of the second lens and the third lens at the d-line, and $v_1$ is an Abbe number of the first lens at the d-line.

6. The zoom lens as claimed in claim 2, wherein each lens in the first lens group satisfies Condition:

$$25 < v_{23A} - v_1 < 36 \tag{6}$$

wherein $v_{23A}$ is an average value of Abbe numbers of the second lens and the third lens at the d-line, and $v_1$ is an Abbe number of the first lens at the d-line.

7. The zoom lens as claimed in claim 3, wherein each lens in the first lens group satisfies Condition:

$$25 < v_{23A} - v_1 < 36 \tag{6}$$

wherein $v_{23A}$ is an average value of Abbe numbers of the second lens and the third lens at the d-line, and $v_1$ is an Abbe number of the first lens at the d-line.

8. The zoom lens as claimed in claim 4, wherein each lens in the first lens group satisfies Condition:

$$25 < v_{23A} - v_1 < 36 \tag{6}$$

wherein $v_{23A}$ is an average value of Abbe numbers of the second lens and the third lens at the d-line, and $v_1$ is an Abbe number of the first lens at the d-line.

9. The zoom lens as claimed in claim 1, wherein the third lens group consists of a plastic lens having an aspheric surface.

10. The zoom lens as claimed in claim 2, wherein the third lens group consists of a plastic lens having at least one aspheric surface.

11. The zoom lens as claimed in claim 3, wherein the third lens group consists of a plastic lens having at least one aspheric surface.

12. The zoom lens as claimed in claim 4, wherein the third lens group consists of a plastic lens having at least one aspheric surface.

13. The zoom lens as claimed in claim 5, wherein the third lens group consists of a plastic lens having at least one aspheric surface.

14. The zoom lens as claimed in claim 6, wherein the third lens group consists of a plastic lens having at least one aspheric surface.

15. The zoom lens as claimed in claim 7, wherein the third lens group consists of a plastic lens having at least one aspheric surface.

16. The zoom lens as claimed in claim 8, wherein the third lens group consists of a plastic lens having at least one aspheric surface.

* * * * *